United States Patent [19]

Sato et al.

[11] Patent Number: 5,440,220
[45] Date of Patent: Aug. 8, 1995

[54] BATTERY DISCHARGE CONTROL CIRCUIT

[75] Inventors: Syojiro Sato; Koji Umetsu; Masayoshi Sasaki, all of Miyagi, Japan

[73] Assignee: Sony Corporation, Japan

[21] Appl. No.: 284,269

[22] Filed: Aug. 2, 1994

Related U.S. Application Data

[63] Continuation of Ser. No. 935,973, Aug. 27, 1992, abandoned.

[30] Foreign Application Priority Data

Sep. 9, 1991 [JP] Japan .................... 3-227992

[51] Int. Cl.$^6$ ........................... H02J 7/00
[52] U.S. Cl. ........................... 320/13; 429/61
[58] Field of Search ........................... 320/13

[56] References Cited

U.S. PATENT DOCUMENTS

| | | | |
|---|---|---|---|
| 3,831,081 | 8/1974 | Weiss | 320/13 |
| 3,930,198 | 12/1975 | Williamson, Jr. | 320/13 |
| 4,575,669 | 3/1986 | Brown | 320/13 |
| 4,713,564 | 12/1987 | Kimball et al. | 320/13 |
| 4,902,956 | 2/1990 | Sloan | 320/13 |
| 5,089,762 | 2/1992 | Sloan | 320/13 |
| 5,159,257 | 10/1992 | Oka et al. | 320/13 |
| 5,173,653 | 12/1992 | Hochstein | 320/13 |

FOREIGN PATENT DOCUMENTS

| | | |
|---|---|---|
| 1495689 | 12/1977 | United Kingdom . |
| 2100543 | 12/1982 | United Kingdom . |

Primary Examiner—Mukund J. Shah
Assistant Examiner—Matthew V. Grumbling
Attorney, Agent, or Firm—Ronald P. Kananen

[57] ABSTRACT

A battery discharge control circuit is provided with a timer for timing the decision of the state of a battery loaded into a battery discharger between a discharged state and a nondischarged state so that the state of the battery is decided a predetermined time after the battery has been loaded into the battery discharger. The control circuit prevents the battery discharger from discharging an undischarged battery due to noise generated by chattering contact between the battery and the battery discharger in loading the battery into the battery discharger or due to the variation of the detected value of the terminal voltage of the battery caused by the influence of the self-healing characteristic and temperature characteristic of the battery. The control circuit also prevents the battery discharger from again discharging a discharged battery.

12 Claims, 4 Drawing Sheets

BATTERY DISCHARGE CONTROL CIRCUIT

This application is a continuation of application Ser. No. 07/935,973 filed Aug. 27, 1992 now abandoned.

BACKGROUND OF THE INVENTION

1. Field of the Invention

The present invention relates to a battery discharge control circuit and, more specifically, to a battery discharge control circuit to be incorporated into a battery discharger or a battery discharger combined with a battery charger to detect the charged state of a battery and to discharge the battery when the battery is not discharged.

2. Description of the Prior Art

Forced discharge of a battery by a battery discharger to cancel the memory effect of the battery needs caution against overdischarge. The battery discharger detects the terminal voltage $V_b$ of the battery, discharges the battery according to the discharged state of the battery and decides if the battery is discharged. As shown in FIG. 5, when a nondischarged battery, for example, a Ni—Cd battery (nickel-cadmium battery) having a rated voltage of 6 V and a terminal voltage of 5 V or above, is loaded into a battery discharger, the battery discharger starts discharging the battery automatically in a constant-current discharge mode or a constant-resistance discharge mode and stops discharging the battery upon a decrease of the terminal voltage $V_b$ below about 5 V and a decrease of the discharge current $I_D$ to zero. The battery discharger may be provided with a discharge start button and the battery discharging operation may be started by pushing the discharge start button.

The battery discharger that judges the discharged state of the battery simply from the terminal voltage $V_b$ of the battery is unable, in some cases, to judge the discharged state of the battery correctly because the terminal voltage $V_b$ of the battery is dependent on the self-healing characteristic and temperature characteristic of the battery. If the battery discharger is unable to discriminate correctly between the discharged state and the nondischarged state, the terminal voltage $V_b$ of a battery in a nondischarged state loaded into the battery discharger increases and the state of the battery becomes a discharged state or the state of the battery becomes a discharged state after the battery has completely been discharged, so that discharge starting time and discharge frequency are indefinite.

Furthermore, when a battery is loaded into a battery discharger that starts discharging the battery automatically upon the reception of the battery therein, it occurs sometimes that battery discharger is unable to detect the terminal voltage $V_b$ of the battery correctly due to noise generated by chattering contact action between the battery and the battery discharger in loading the battery into the battery discharger.

SUMMARY OF THE INVENTION

Accordingly, it is an object of the present invention to provide a battery discharge control circuit provided with a timer for timing the decision of the state of a battery loaded into a battery discharger between a discharged state and a nondischarged state so that the state of the battery is decided a predetermined time after the battery has been loaded into the battery discharger. The control circuit prevents the battery discharger from discharging an undischarged battery due to noise generated by chattering contact between the battery and the battery discharger in loading the battery into the battery discharger or due to the variation of the detected value of the terminal voltage of the battery caused by the influence of the self-healing characteristic and temperature characteristic of the battery. The control circuit also prevents the battery discharger from again discharging a discharged battery.

Thus, the battery discharge control circuit prevents the variation of the detected value of the terminal voltage $V_b$ of the battery due to noise generated by the chattering contact between the battery and the battery discharger, and the self-healing characteristic and temperature characteristic of the battery.

BRIEF DESCRIPTION OF THE DRAWINGS

The above and other objects, features and advantages of the present invention will become more apparent from the following description taken in connection with the accompanying drawings, in which.

DETAILED DESCRIPTION OF THE PREFERRED EMBODIMENTS

Figure 1:
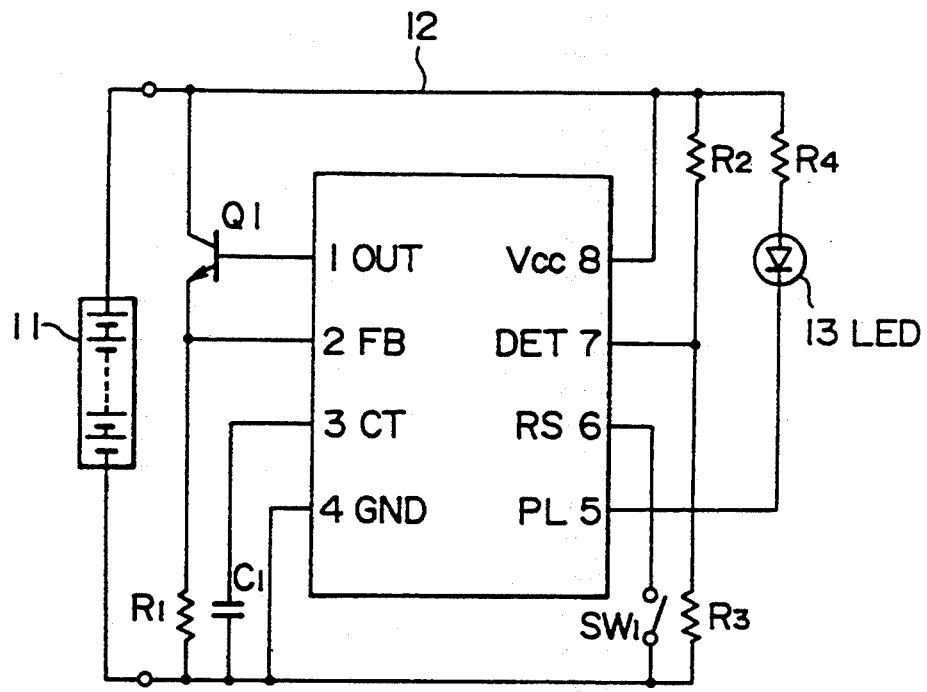
FIG. 1 is a circuit diagram of a battery discharge control circuit in a preferred embodiment according to the present invention.

Referring to FIG. 1, a battery discharge control circuit comprises an integrated circuit (IC) 12, a discharge monitor lamp 13, such as a light emitting diode, which is turned on during discharge, a transistor $Q_1$, resistors $R_1$, $R_2$, $R_3$ and $R_4$, a capacitor $C_1$ and a discharge cancellation switch $SW_1$. Indicated at 11 is a battery to be discharged. The transistor $Q_1$ and the resistor $R_1$ are a load on the battery 11. A timing period is determined by the capacitor $C_1$. Discharge of the battery 11 is controlled in a constant-current control mode. Discharge can be cancelled by opening the discharge cancellation switch $SW_1$. A discharge start voltage and a discharge cancellation voltage are determined respectively by the resistors $R_2$ and $R_s$.

The IC 12 has eight terminal. An output terminal 1 is connected to the base of the transistor $Q_1$ and a feedback terminal 2 to which voltage at the point of connection of the resistor $R_1$ and the transistor $Q_1$ is applied. The voltage at the output terminal 1 is regulated on the basis of the voltage applied to the feedback terminal 2 so that the discharge current is constant. A capacitor terminal 3 is connected to the capacitor $C_1$ for determining a time constant, i.e., a terminal connected to the capacitor $C_1$ which determines time for which a monostable multivibrator 21 is set. Other terminals are a grounding terminal 4, a pilot terminal 5 through which an output for driving the pilot lamp 13 is applied to the pilot lamp 13 in synchronism with the appearance of an output at the output terminal 1, a reset terminal 6 to which a signal to stop the application of an output to the output terminal 1 forcibly is applied, a detection terminal 7 to which the terminal voltage $V_b$ of the battery 11 is applied, and a supply voltage terminal 8 to which the terminal voltage $V_b$, i.e., a supply voltage $V_{CC}$, is applied. The terminal voltage $V_b$ is compared with a threshold voltage, for example, 5 V by comparing corresponding voltages in a comparator.

Figure 2A:
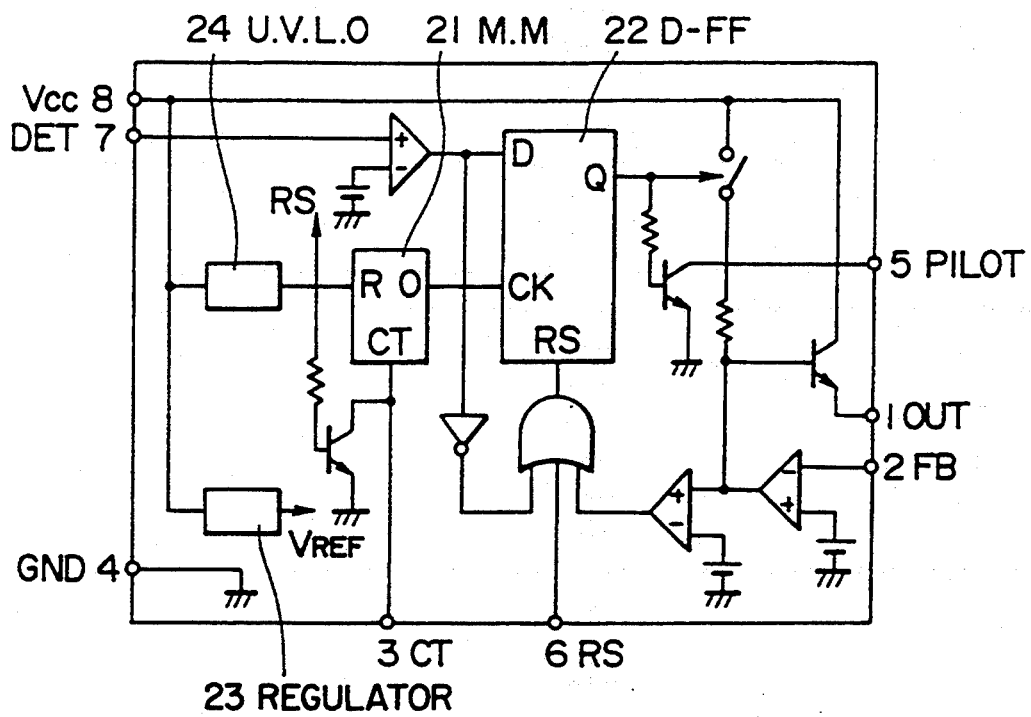
FIGS. 2a and 2b are circuit diagrams of an integrated circuit included in the battery discharge control circuit of FIG. 1.
Figure 2B:
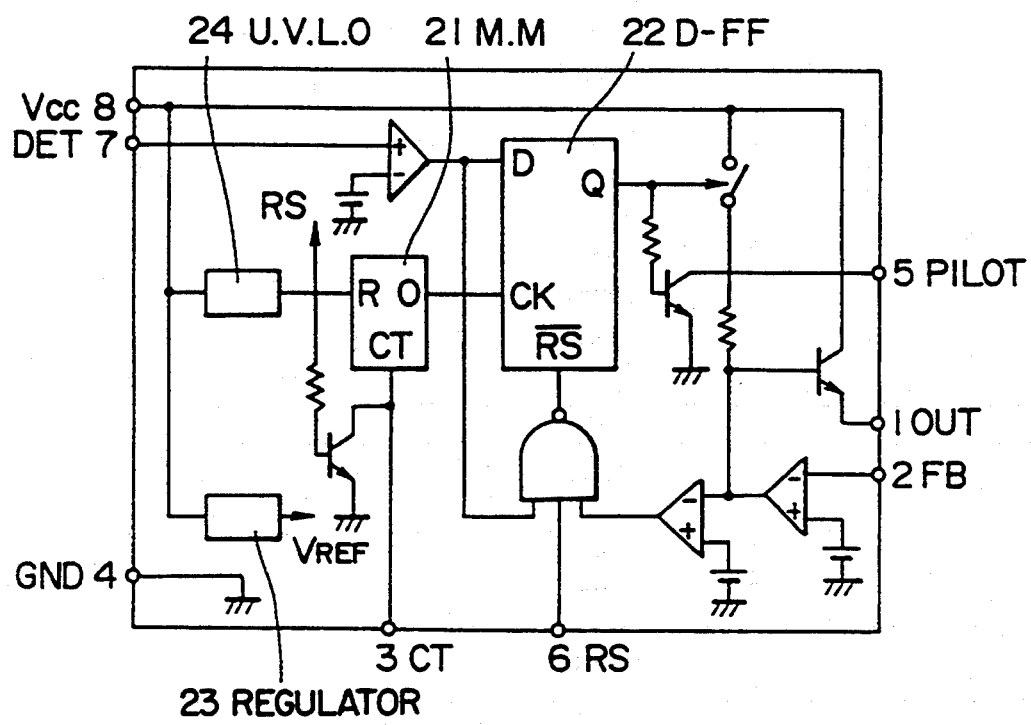

Referring to FIGS. 2a and 2b, the IC 12 comprises, as principal components, a monostable multivibrator 21, a D-type flip flop 22, a voltage regulator 23 for setting reference voltages for the IC 12, and an under voltage lock-out circuit 24. In FIG. 2a, the D-type flip flop 22 receives at its RS terminal an output from a 3-input NOR gate. In FIG. 2b, the output from a 3input NAND gate is provided at the $\overline{RS}$ terminal.

The monostable multivibrator 21 generates a pulse signal of a time constant determined by the capacitance of the capacitor $C_1$ connected to the capacitor terminal 3. The pulse signal is applied as a clock signal to the terminal CK of the D-type flip flop. The pulse signal consists of a series of rectangular pulses for setting a fixed time. The output pulse signal of the monostable multivibrator 21 is denoted by M.M.(O). The output pulse signal M.M.(O) of the monostable multivibrator 21 determines the fixed time between the start of the IC 12 and the detection of the terminal voltage $V_b$ of the battery 11. The D-type flip flop 22 provides an output representing a discharged state or a nondischarged state at the output Q upon the termination of the timing period. When an output of the comparator is set, the output terminal Q goes HIGH at the trailing edge of a pulse to apply a fixed voltage to the output terminal 1. The voltage regulator 23 determines a threshold voltage $V_{TH}$ for the IC circuit 12. The under voltage lock-out circuit 24 resets all the logic elements including the timer when the input voltage $V_{CC}$ is lower than the value of the reference voltage $V_{REF}$ to obviate malfunction when the input voltage $V_{CC}$ is excessively low.

Figure 3:
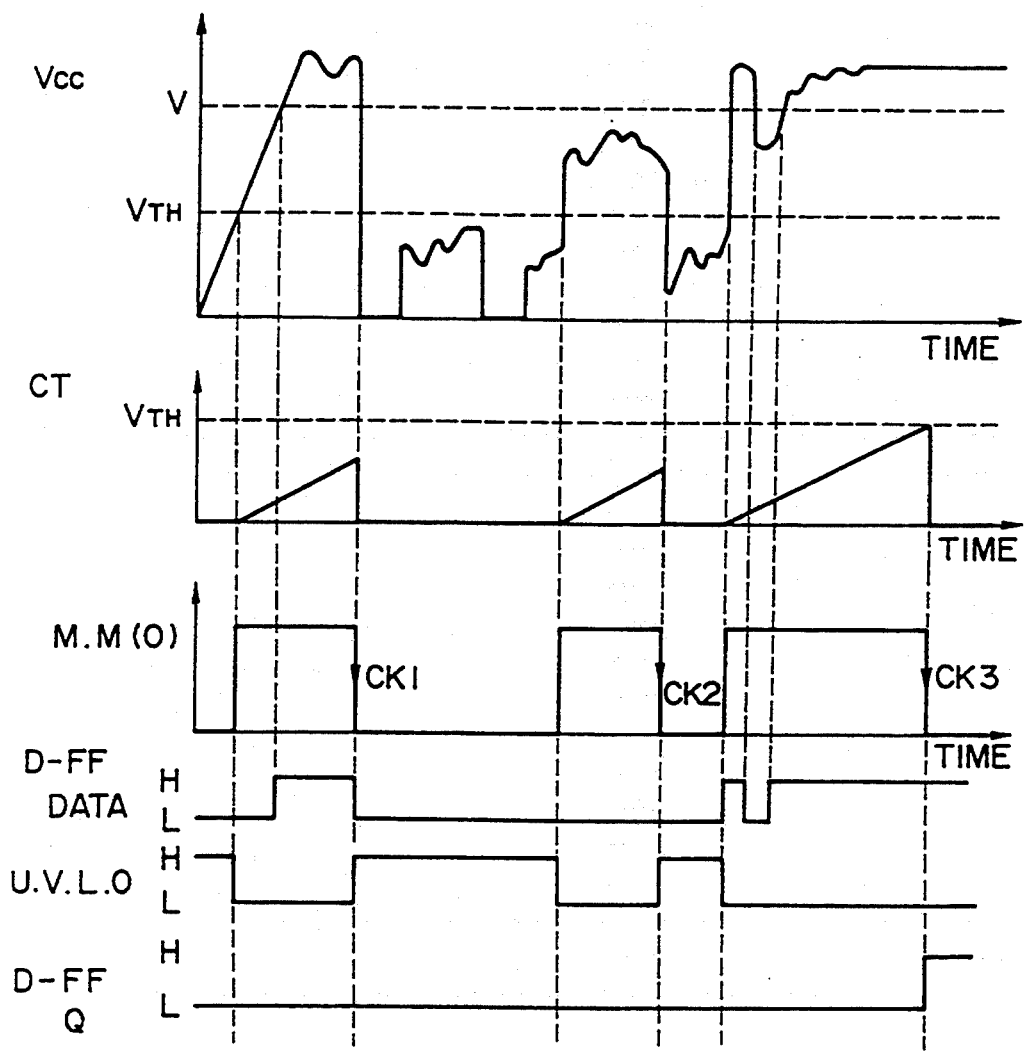
FIG. 3 is a timing diagram of assistance in explaining the operation of the battery discharge control circuit of FIG. 1.

Suppose that the input voltage $V_{CC}$ varies with time as shown in FIG. 3. The four times of the variation in the input voltage $V_{CC}$ in the initial stage are due to chattering or the like. When the input voltage $V_{CC}$ exceeds the threshold voltage $V_{TH}$, the voltage at the terminal 3 increases, and then the monostable multivibrator 21 gives a pulse signal M.M.(O) of a time constant determined by the capacitance of the capacitor $C_1$ to the clock terminal CK of the D-type flip flop 22. Since the input voltage $V_{CC}$ does not exceeds the threshold voltage $V_{TH}$ in the second variation, the pulse signal M.M.(O) is not generated. Since the input voltage $V_{CC}$ exceeds the threshold voltage $V_{TH}$ in the first, third and fourth variation of the input voltage $V_{CC}$, the pulse signal M.M.(O) is generated accordingly. Suppose that the trailing edges of the pulses of the pulse signal are CK1, CK2 and CK3. Then, the output of the comparator as data of the D-type flip flop 22 goes HIGH when the input voltage $V_{CC}$ exceeds a set discharge voltage of, for example, 5 V. On the other hand, when the output of the under voltage lock-out circuit 24 is LOW when the input voltage $V_{CC}$ is below the threshold voltage $V_{TH}$. At the trailing edges CK1 and CK2, the data of the D-type flip flop 22 goes HIGH to apply reset signals and the output terminal Q remains LOW. At the trailing edge CK3, the data of the D-type flip flop 22 is HIGH, the under voltage lock-out circuit 24 does not applies any reset signal to the reset terminal of the monostable multivibrator 21, and the output at the terminal 1 of the D-type flip flop goes HIGH to start discharging the battery.

Figure 4:
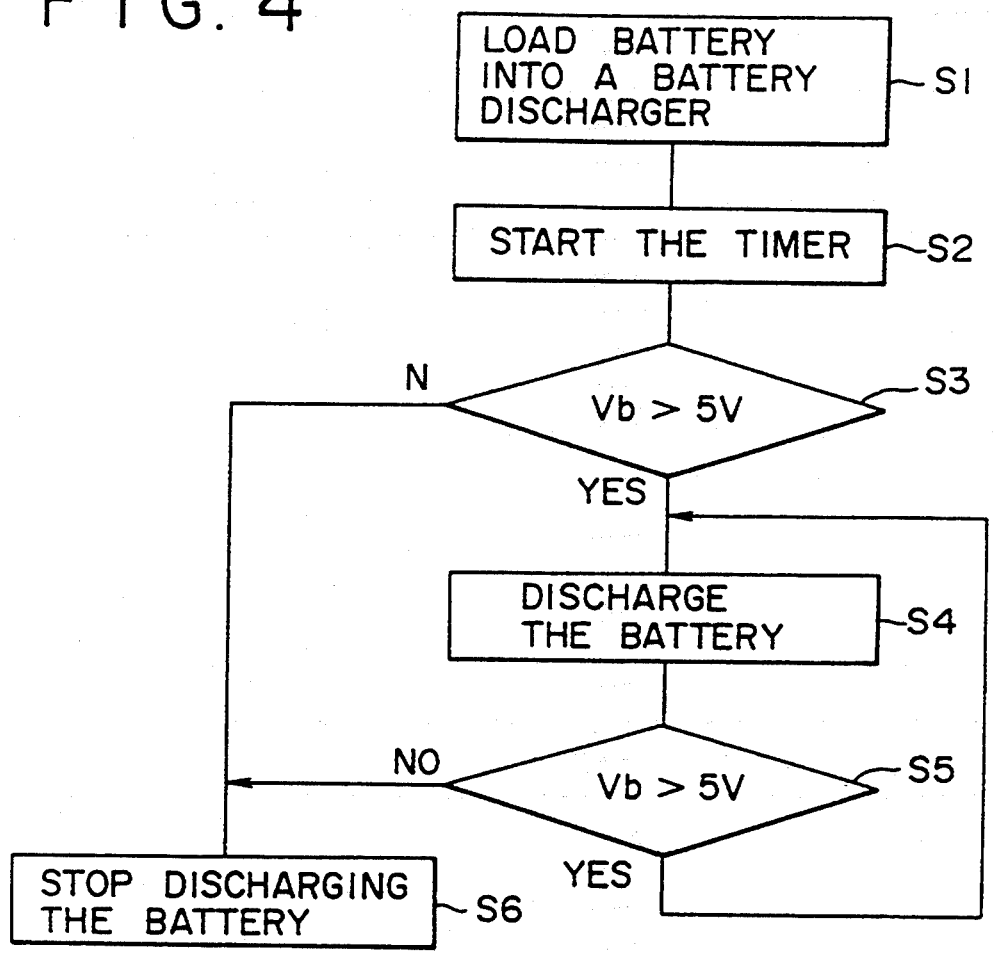
FIG. 4 is a flow chart of assistance in explaining the operation of the battery discharge control circuit of FIG. 1.
Figure 5:
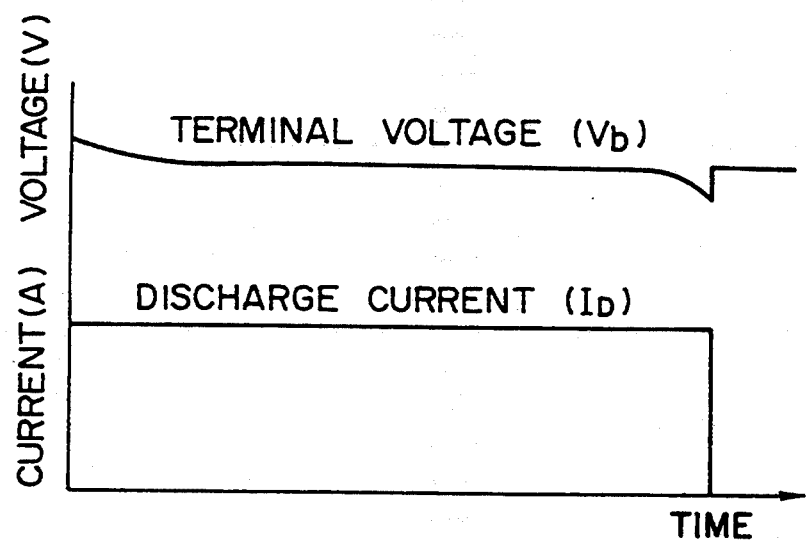
FIG. 5 is a graph showing the variation of the terminal voltage of a battery and discharge current with discharge time.

FIG. 4 shows a control procedure to be carried out by the battery discharge control circuit. In step S1, an input voltage $V_{CC}$ is applied to the IC 12 when the battery 11 is loaded into the battery discharger. In step S2, the set time between the start of the IC 12 and the detection of the terminal voltage $V_b$ of the battery 11 is counted. In step S3, a query is made to see if the terminal voltage $V_b$ of the battery 11 is higher than the set discharge voltage of, for example, about 5 V. The terminal voltage $V_b$ of a Ni—Cd battery having a rated voltage of 6 V is about 5 V. Discharge is stopped in step S6 if the response in step S3 is negative, i.e, if the terminal voltage $V_b$ of the battery 11 is about 5 V in below, or step S4 if the response in step S3 is affirmative. In step S4, the battery 11 is discharged. In step S5, a query is made to see if the terminal voltage $V_b$ is higher than, for example, about 5 V. Discharge is stopped in step S6 if the response in step S5 is negative, i.e., if the terminal voltage $V_b$ is about 5 V, otherwise below or the routine returns to step S4 for discharge if the response in step S5 is affirmative.

Since the battery discharge control circuit is an IC circuit and the battery to be discharged can be used as the power supply for the IC circuit, the battery control circuit needs a relatively small number of parts and hence the battery control circuit is inexpensive. A battery discharger incorporating the battery discharge control circuit of the present invention can be formed in a relatively small size and the battery discharge control circuit consumes relatively small power.

Although the invention has been described in its preferred form with a certain degree of particularity, obviously many changes and variations are possible therein. It is therefore to be understood that the present invention may be practiced otherwise than as specifically described herein without departing from the scope and spirit thereof.

What is claimed is:

1. A battery discharge control circuit, comprising:
 a timer for generating a timing signal a predetermined time after a secondary battery has been loaded into a battery discharger;
 detecting means for detecting a terminal voltage of said secondary battery;
 a control signal generating circuit which receives an output of the detecting means and an output of the timer, and generates a discharge control signal to discharge said secondary battery when said output of the detecting means indicates said terminal voltage is greater than or equal to a set discharge reference voltage and said output from the timer indicates a predetermined time has elapsed since the secondary battery has been loaded into said battery discharger.

2. A battery discharge control circuit according to claim 1, wherein the timer is a monostable multivibrator.

3. A battery discharge control circuit according to claim 2, wherein a capacitor determines the predetermined time for which the timer is set and is connected to the monostable multivibrator.

4. A battery discharge control circuit according to claim 1, wherein said control signal generating circuit comprises a flip flop which receives the output of the detecting means and the output of the timer.

5. A battery discharge control circuit according to claim 1, further comprising a switch for resetting the output signal of the control signal generating circuit.

6. A battery discharge control circuit according to claim 1, further comprising indicating means for indicating when said control signal is provided by said control signal generating circuit.

7. A battery discharge control circuit according to claim 4, further comprising an under voltage lock-out circuit for resetting said monostable multivibrator and said flip flop when the terminal voltage of the secondary battery is not higher than a reference voltage.

8. A battery discharge control circuit according to claim 7, further comprising a stabilized power supply for producing the reference voltage.

9. A battery discharge control circuit, comprising:
means for detecting a voltage of a secondary battery;
means for comparing the detected voltage of said secondary battery to a reference voltage and for generating a data signal when said detected voltage is greater than said reference voltage;
timing means for producing a timing signal a predetermined time after said voltage of said secondary battery has been detected by said detecting means; and
a discharge path control means for receiving said data signal and said timing signal and for discharging said secondary battery through a discharge path if said data signal is received when said timing signal is received from said timing means.

10. A battery discharge control circuit as set forth in claim 9, further comprising means for disabling said discharge path control means when said detected voltage of said secondary battery is less than a threshold level, said threshold level being less than said reference level.

11. A battery discharge control circuit as set forth in claim 9, wherein said timing means comprises a monostable multivibrator and a capacitor connected to said monostable multivibrator for setting said predetermined time.

12. A battery discharge circuit as set forth in claim 9, wherein said discharge path control means comprises a D-type flip flop receiving said timing signal at its clock input and said data signal at its D input.

* * * * *